Feb. 19, 1952     E. H. MOBLEY     2,586,551
DEVICE FOR SETTING-UP COLLAPSIBLE CELLULAR CARTONS
Filed Aug. 30, 1949     4 Sheets-Sheet 1
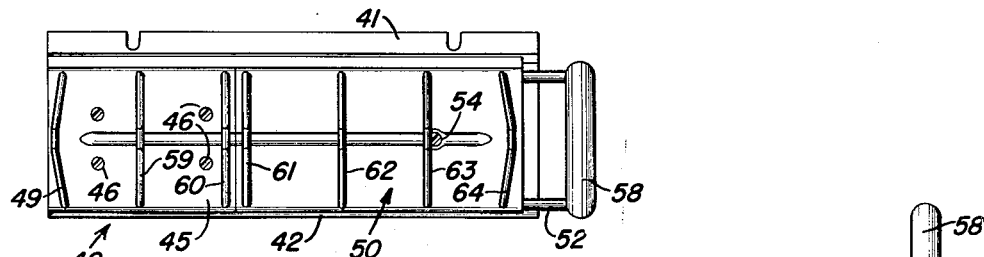
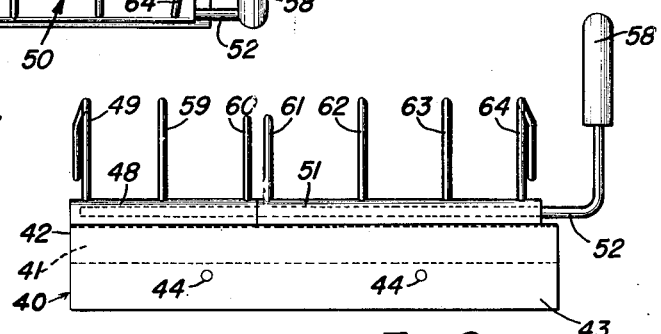
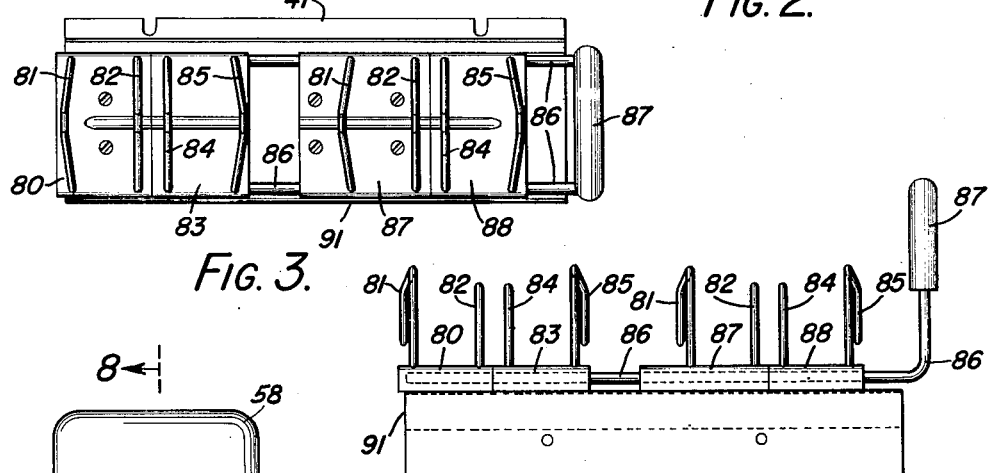
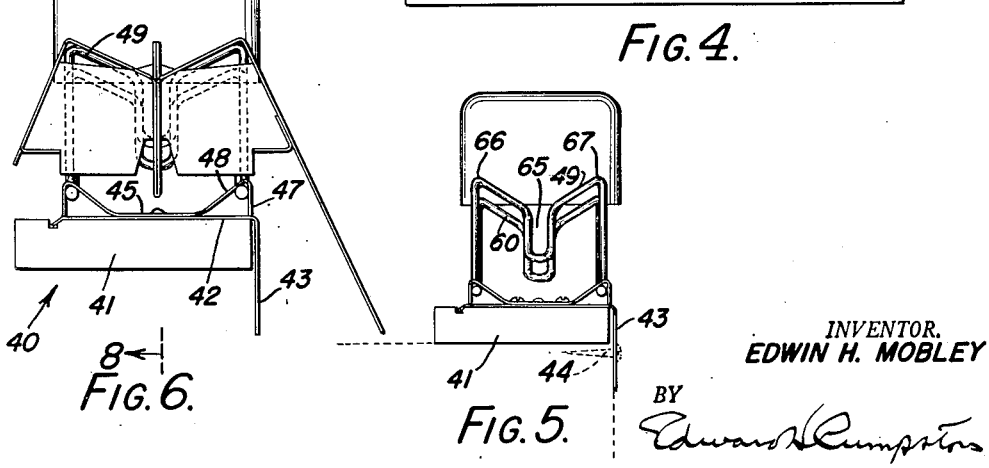
INVENTOR.
EDWIN H. MOBLEY
BY
HIS ATTORNEY

INVENTOR.
EDWIN H. MOBLEY

HIS ATTORNEY

Feb. 19, 1952 E. H. MOBLEY 2,586,551
DEVICE FOR SETTING-UP COLLAPSIBLE CELLULAR CARTONS
Filed Aug. 30, 1949 4 Sheets-Sheet 3

INVENTOR.
EDWIN H. MOBLEY
BY
HIS ATTORNEY

Feb. 19, 1952 E. H. MOBLEY 2,586,551
DEVICE FOR SETTING-UP COLLAPSIBLE CELLULAR CARTONS
Filed Aug. 30, 1949 4 Sheets-Sheet 4
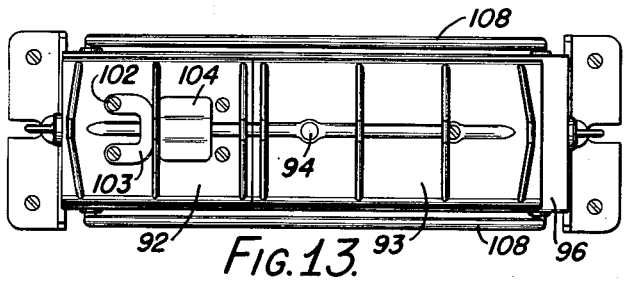
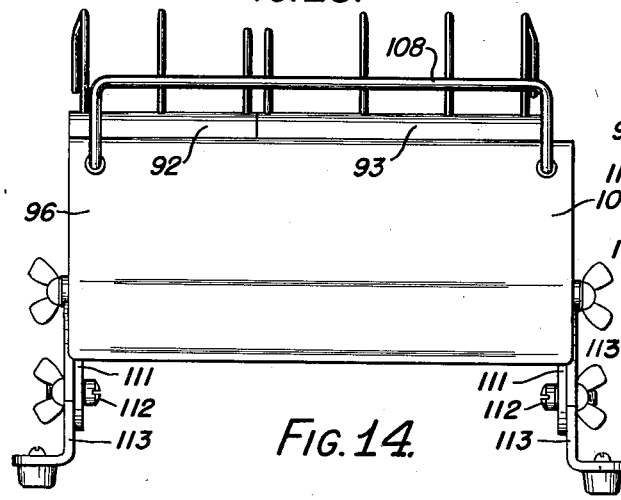
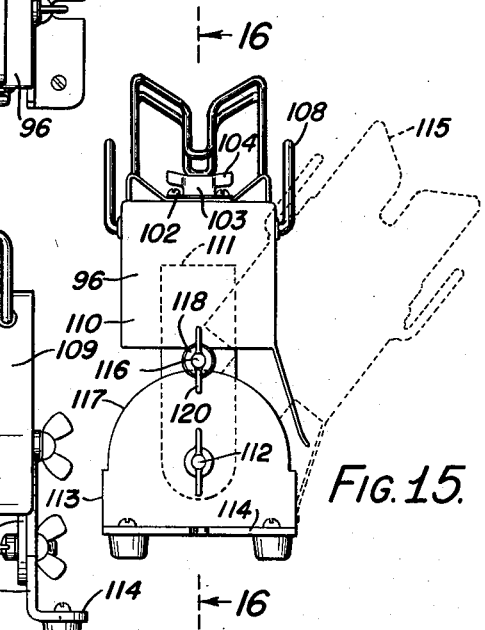
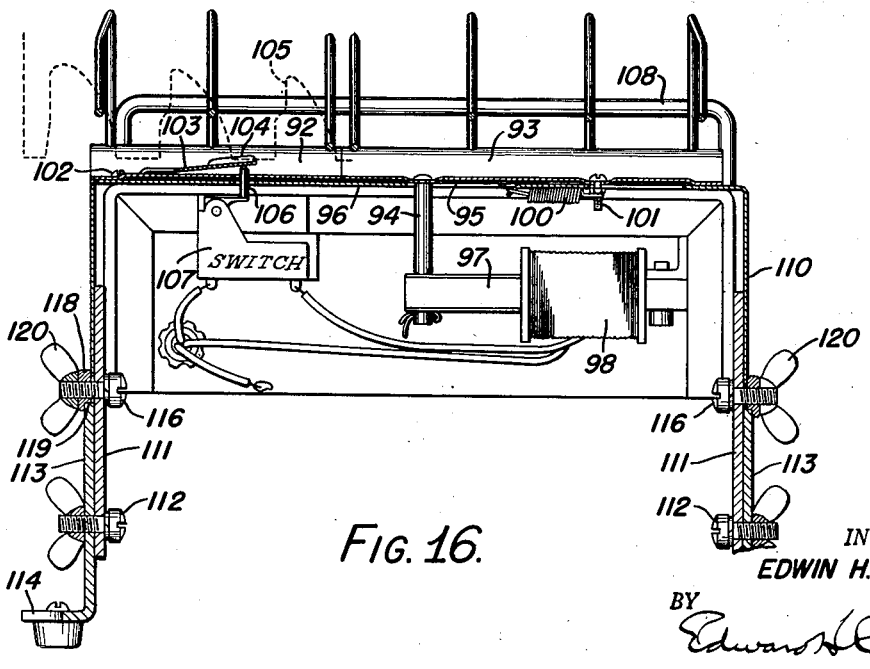
INVENTOR.
EDWIN H. MOBLEY
BY
HIS ATTORNEY Patented Feb. 19, 1952

2,586,551

UNITED STATES PATENT OFFICE 2,586,551

DEVICE FOR SETTING UP COLLAPSIBLE CELLULAR CARTONS

Edwin H. Mobley, Newark, N. Y., assignor to Bloomer Bros. Company, Newark, N. Y., a corporation of New York Application August 30, 1949, Serial No. 113,079

10 Claims. (Cl. 93—37)

This invention relates to devices for setting up collapsible, cellular cartons, such as egg cartons having two rows of six cells each and, more particularly, the known variety having front and rear walls, an upwardly folded, central, longitudinal partition for separating the rows of cells, and a series of transversely extending partitions hinged to the tops of the front and rear walls and adapted to be swung to vertical position to separate the cells of each row. Such cartons are adapted to be collapsed into flat form for storage and transportation and are set up for use by separating the front and rear walls, depressing the bottom portions and disposing the transverse partitions in substantially horizontal position, after which the transverse partitions are swung downwardly to vertical position in securing engagement with the longitudinal partition or with openings in the bottom portion, to complete the setting up of the cartons.

Devices have been known to the art for setting up such cartons, comprising a base having a series of upstanding fingers or blades adapted to engage and swing the transverse partitions from horizontal to vertical position as a partially erected carton is inverted and pressed downwardly thereon. Such devices have not been fully satisfactory, however, because of the failure of the erecting fingers, upon reaching substantial parallelism with the cross partitions, to exert sufficient force to complete the swinging of the partitions and press them into frictional engagement with other portions of the carton for holding them in place. Furthermore, such cartons are commonly constructed with the transverse partitions arranged in two groups hinged to swing in opposite directions and, therefore, difficult to erect by movement against stationary fingers.

One object of the invention, therefore, is to provide an improved device for setting up such cartons having a more efficient, compact and portable type of construction.

Another object is to supply such a device adapted to effectively complete the swinging of the transverse partitions to erected position and thus complete the erection of the cells, so that articles may be inserted in the cells with a minimum of resistance and effort to thereby produce cartons which are set up in more precise and strong condition and which are easier to fill and handle.

Another object is to provide a device of the character described having provision for moving different transverse partitions in different directions as required in types of cartons in common use.

A further object is to provide such a device capable of being conveniently operated either manually or by a simple electric motor.

Still a further object is to afford a device having the above advantages in a simple, practical and inexpensive type of construction.

To these and other ends the invention resides in certain improvements and combinations of parts, all as will be hereinafter more fully described, the novel features being pointed out in the claims at the end of the specification.

In the drawings:

Fig. 1 is a top plan view of a device embodying the present invention;

Fig. 2 is a side elevation of the same;

Fig. 3 is a top plan view of a modified construction for setting up a slightly modified carton;

Fig. 4 is a side elevation of the device shown in Fig. 3;

Fig. 5 is an end elevation of the devices shown in Figs. 1 to 4, inclusive;

Fig. 6 is an end elevation of the same having a carton applied thereto and shown in erected position;

Fig. 13 is a top plan view of a device similar to that shown in Fig. 1, but having electric motor operating means;

Fig. 14 is a side elevation of the device shown in Fig. 13;

Fig. 15 is an end elevation of the same, and

Fig. 16 is a sectional elevation on the line 16—16 in Fig. 15.

Figure 7:
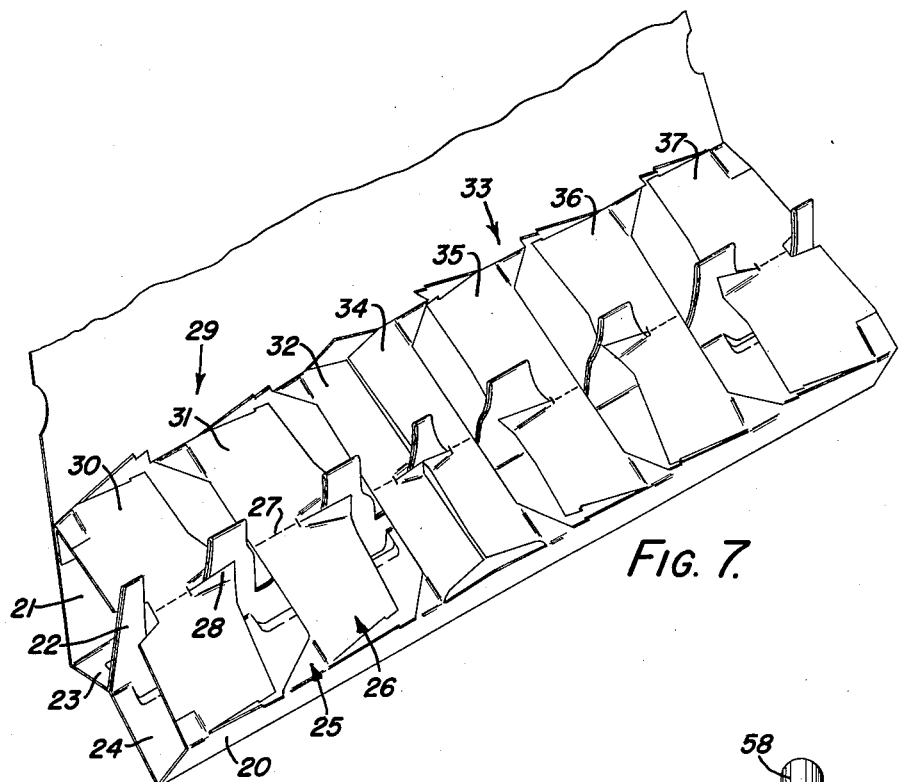
Fig. 7 is a perspective view, partly broken away, of a partially erected carton of the variety adapted to be set up by the device shown in Fig. 1.

The invention is embodied, in the present instance, by way of illustration, in a device for completing the setting up of egg cartons of the variety commonly made of a one-piece blank of material cut, scored and folded to form two rows of six cells each. Such a carton is shown in Fig. 7, comprising a front wall 20, a rear wall 21 and a central longitudinal partition 22 made by folded up portions between the bottom sections 23 and 24. A top wall indicated generally at 25 is connected with the tops of the front and rear walls and is cut and scored to form a series of transverse partitions indicated generally at 26, hinged to swing from a partially erected horizontal position in Fig. 7 to a vertical position to separate the cells of each row. The transverse partitions are formed with score lines 27 about which their opposite halves are adapted to be folded upwardly, as the bottom sections are folded inwardly to bring the several parts including the front and rear walls into flat, collapsible condition.

In setting up a carton, the front and rear walls are pulled apart, the bottom sections 23 and 24 depressed, and the transverse partitions flattened into a substantially horizontal plane. These setting up manipulations are readily accomplished by hand, after which it is necessary to swing the transverse partitions from horizontal to vertical position in which their slotted bottom portions 28 frictionally engage the sides of notches in the longitudinal partition, to retain the partitions in erected position, and the present invention provides a device for rapidly swinging the transverse partition to such vertical position to complete the setting up of the carton ready for filling its cells with eggs or other articles.

Such cartons are commonly made, furthermore, with two or more groups of transverse partitions swinging in opposite directions to erected positions. One group indicated generally at 29 includes three partitions, 30, 31 and 32, having their bottoms swinging to the left about their hinged connections with the tops of the front and rear walls. Another group indicated generally at 33 comprises partitions 34 to 37, inclusive, having their bottoms swinging downwardly and to the right about their connections with the front and rear walls and the present invention provides a device for swinging the different groups of partitions in opposite directions as will now be described.

The setting up device of the present invention has a base portion indicated generally at 40 comprising an elongated block 41 of wood or other suitable material on which is a base plate 42 one side of which is turned downwardly below the edge of the block to form an apron 43. Apron 43 is formed with holes for the reception of nails or screws 44, thus adapting the base to be secured to the side of a table or workbench indicated in broken lines in Fig. 5.

Superposed on base plate 42 is a supporting plate 45 extending through a portion only of the length of the base as indicated in Fig. 1. Base plate 42 and supporting plate 45 are both fixed to block 41 by screws as 46 (Fig. 1). Supporting plate 45 has its opposite side edges bent upwardly and thence downwardly as at 47 to form the inverted V-shaped portions 48 in which are fixed a plurality of upwardly extending blades or wire loops as 49 for swinging the transverse partitions as hereafter described. Resting on base plate 42, also, in alinement with supporting plate 45, is a part or slide indicated generally at 50 having substantially the same shape as supporting plate 45, including inverted V-shaped marginal portions 51 (Fig. 2) similar to portions 48 of plate 45.

Figure 8:
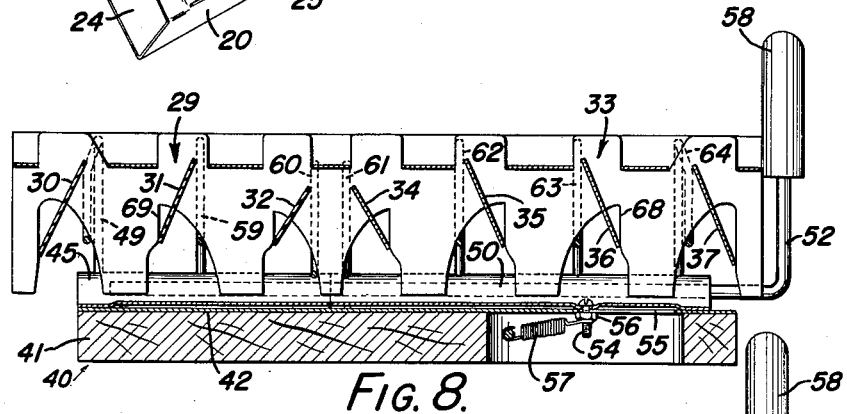
Fig. 8 is an enlarged, sectional elevation on the line 8—8 in Fig. 6 and showing a carton on application to the device before erection.

Welded or otherwise fixed in the apex of each portion 51 is a rod 52. The ends of these rods project to a distance beyond the inner end of slide 50 as at 53 to slidably engage in the portions 48 of plate 45 which thus serve as slideways for guiding the movement of slides 50 longitudinally of the base. In addition the slide carries the bolt 54 (Figs. 1, 8 and 9) depending through a slot 55 in base plate 42 and retained by a nut 56 to further guide the movement of the slide. A spring 57 tends to pull the slide inwardly into abutting relationship with the supporting plate 45 as shown in Fig. 8. The rods 52 extend outwardly beyond the outer end of the slide and are turned upwardly and equipped with a manually engagable abutment 58 for moving the slide from the position shown in Fig. 8 to the position shown in Fig. 9.

For setting up a carton of the design shown in Fig. 7, the supporting plate 45 is provided with three upstanding, equally spaced blades or wire loops 49, 59 and 60 (Fig. 2) for engaging the transverse partitions 30, 31 and 32. Slide 50 is provided with equal blades 61 to 64, inclusive, for swinging the transverse partitions 34 to 37, inclusive. The partitions 32 and 34 are shorter than the rest and their adjacent lower edges swing in opposite directions, so that blades 60 and 61 are lower than the rest of the blades and are positioned more closely together in the initial position of the slide 50 as shown in Figs. 1 and 2. It will be noted that the blades, or wire loops in the present instance, have their tops recessed as at 65 (Fig. 5) to accommodate the central longitudinal partition 22 of the inverted carton, thus providing, in effect, two parallel rows 66 and 67 of blades spaced longitudinally in each row.

Figure 9:
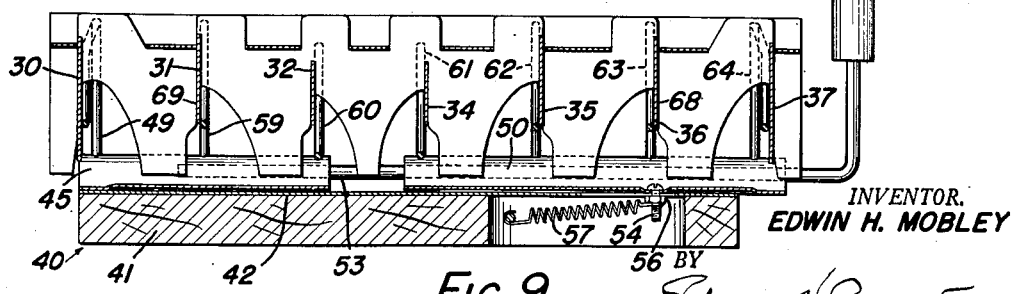
Fig. 9 is a similar view showing the parts in position for completing the setting up of the carton.

In operation, the carton having been partially set up as shown in Fig. 7, with the transverse partitions lying substantially in the transverse horizontal plane, the carton is inverted and pressed down over the series of blades 49 to 64, inclusive, as shown in Figs. 6 and 8. The right hand end of the carton is located adjacently to the abutment or handle 58 with the result that one of the fingers or blades engages each of the transverse partitions while the recessed blades receive the longitudinal partition and with the front and rear walls serve to position the carton in the transverse direction. The pressure of the carton moves the partitions against the blades and swings the latter to the inclined, partially set up positions shown in Fig. 8, the group of partitions 29 being swung in one direction and the group 33 in the opposite direction. With the carton pressed downwardly until its bottom sections engage the tops of the blades, the abutment or handle 58 is pushed toward the right as shown in Fig. 9. Such operation moves the slide 50 toward the right so that its blades swing the partitions 33 in the proper direction to vertical position in which they are stopped by engagement with shoulders 68 in the notches formed to accommodate them in the longitudinal partition. Movement of the partitions by the blades against these stops moves the carton to the right so as to bring its partitions 29 against the stationary blades 49, 59 and 60 on the base, thus similarly swinging these partitions to vertical position against their stop shoulders as 69 on the longitudinal partition. The result is that the two groups of partitions each moving as a single unit are quickly and in rapid succession swung to vertical position in which they are retained by frictional engagement of their slotted bottoms with the longitudinal partition. The carton is then lifted from the device for repetition of the operation with another carton.

Figure 10:
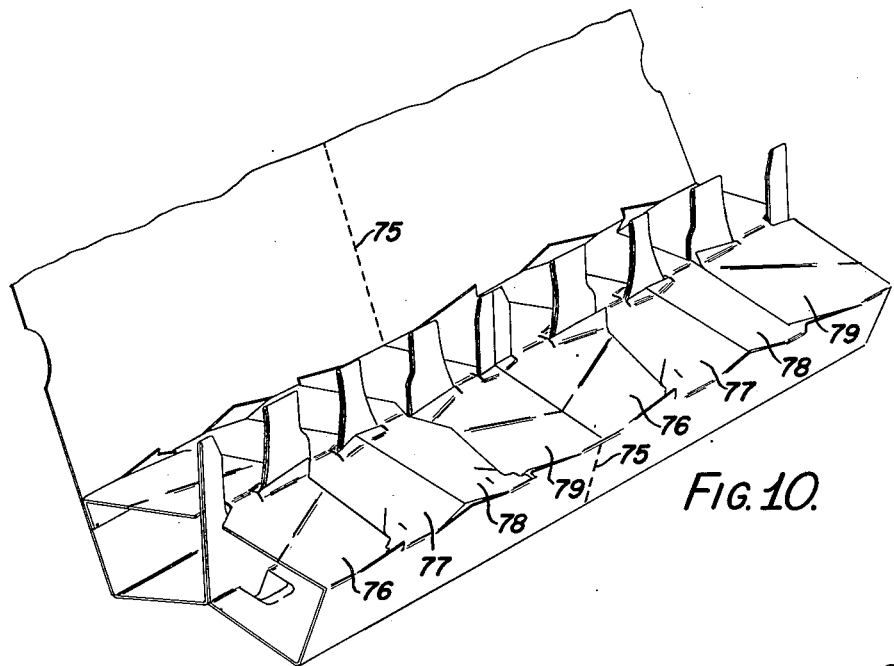
Fig. 10 is a perspective view, partly broken away, of a partially erected carton of a slightly modified construction adapted to be set up by the device shown in Fig. 3.

A slightly modified design of a carton is shown in Fig. 10, of the variety in which the carton blank is scored transversely as at 75 so that the carton may be readily torn into halves, each containing but six cells as indicated in the drawings. In this type of carton each half comprises two transverse partitions 76 and 77 swinging in one direction and two partitions 78 and 79 swinging in the opposite direction. Accordingly the device is provided with a stationary base plate 80 (Fig. 11) carrying blades 81 and 82 and with a short slide 83 carrying blades 84 and 85. Slide 83 is fixed on a pair of rods as 86. For the other half of the carton the device comprises a stationary base plate 87 similar to plate 80 and slide 88 similar to slide 83, with similarly arranged blades. The rods 86 are guided in the slideways of base plates 80 and 87 and slide 88 is provided with a bolt 89 moving in a slot 90 in the base plate 91 similar to base plate 42. Rods 86 are provided with a similar handle 87 for moving both slides 83 and 88 toward the right against the tension of a spring 88' connected with the bolt 89 and with a stationary part of the base.

Figure 11:
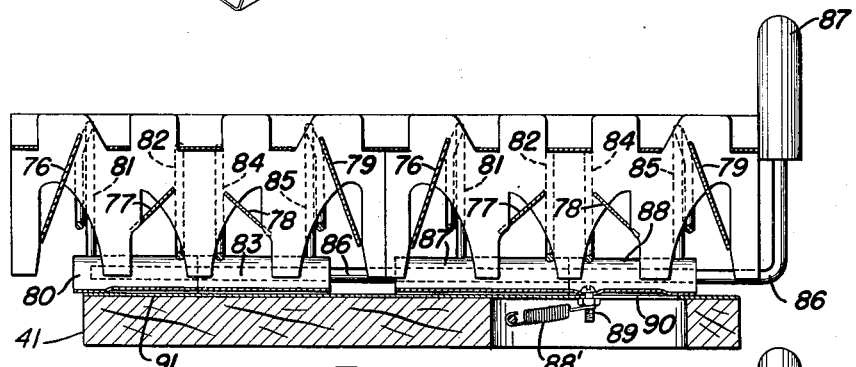
Fig. 11 is an enlarged, sectional elevation on the line 8—8 in Fig. 6 showing the carton of Fig. 10 applied to the device of Fig. 3 before the erection of the partitions.
Figure 12:
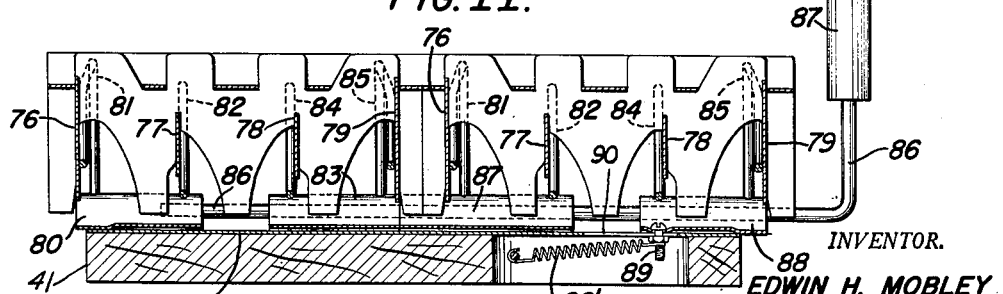
Fig. 12 is a similar view showing the partitions completely erected.

In setting up a carton such as shown in Fig. 10, it is partially set up as described for the first type of carton and then inverted and pressed down against the blades of the device with the result that the blades swing the different partitions in the different directions so as to partially erect them as shown in Fig. 11. Handle 87 is then moved to the right, moving the slides 83 and 88 and the blades 84 and 85 to complete the setting up of the corresponding partitions. As these partitions reach a vertical position, they engage the stop shoulders on the longitudinal partitions, moving the carton to the right and bringing the remaining partitions into engagement with the stationary blades 81 and 82 to set them up also. The handle is then released and the carton removed for the repetition of the operation.

Figs. 13 to 16, inclusive, illustrate a further modification in which a device similar to that shown in Fig. 1 has a similar stationary supporting plate 92 and the slide 93 on a similar base. Slide 93 has a post 94 depending through a slot 95 in base plate 96. The bottom of the post is connected with the movable armature 97 of the solenoid 98 energized by electrical connections as well understood in the art. A spring 100 is connected with a bolt 101 on the slide and with the base plate and tends to move the slide to initial position and means are provided to automatically move the slide against the spring to engage the transverse partitions, as will now be described.

Fixed to the stationary supporting plate 92 at 102 is a resilient metal strip 103, the free end of which is broadened as at 104 in position to be engaged by a portion, as 105, of the longitudinal partition of a carton pressed downwardly as described above on the blades. Such downward movement of the strip 103 brings it into engagement with a lever 106 of switch means 107 for closing the circuit through the solenoid 98. Such operation of the solenoid moves first the slide and then the carton toward the right as described above so as to simultaneously set up the partitions swinging in opposite directions. Removal of the erected carton releases strip 104 and the switch which is spring activated to open the circuit and allow spring 100 to restore the blades to initial position. The base may be provided with side rails, as 108, serving as stops for engagement with the hinges of the transverse partitions of the carton and for holding the triangular hinges flat against buckling, to thereby insure proper bending and more precise positioning of the parts.

In the modification of Figs. 13 to 16, the base plate 96 has its side apron 109 provided with end extensions 110 to each of which a depending standard 111 is welded or otherwise suitably fixed. The lower end of each depending standard 111 is apertured and provided with a bolt 112 extending outwardly through an opening in a standard 113 extending upwardly from a supporting base or end flange 114, so that the whole erecting device with its depending standards 111 may be swung about the bolts 112 to swivel the device to a forwardly inclined position such as shown in dotted lines at 115 in Fig. 15. By this means the device may be adjustably inclined toward the operator to the most convenient operating position. Means are provided for locking the device when swiveled to such a position comprising a bolt 116 extending outwardly from each depending standard 111 between the apron extensions 110 and the base standards 113. The latter have upper edges of semi-cylindrical shape 117 and a washer 118 on bolt 116 has its under side kerfed as at 119 to ride along the edge of its standard 117 as the device is swiveled to different positions. A wing nut 120 is provided on each bolt 116 for clamping washer 118 on the edge of the standard 117, at each end of the device, for releasably locking it at any desired inclination.

It is evident from the above description that with a carton of the character described such as shown, for example, in Figs. 7 and 10, after the carton has been distended and partially set up to bring its transverse partitions to horizontal position, the carton may be rapidly located and pressed downwardly over the upstanding blades of the device to first swing the partitions to partially erected position. In the modified arrangement shown in Figs. 1 and 2, a short movement of the hand longitudinally of the carton serves to move all of the partitions concomitantly to fully vertical position and to complete the setting up of the carton. In the modified construction shown in Figs. 13 to 16, inclusive, the pressure of the carton against the blades first swings the partitions to partially erected position and then brings the carton into engagement with the switch means described to bring about a motor operated movement of the slides and similarly complete the setting up of the carton. It is evident also that the motor-operated mechanism of Figs. 13 to 16, inclusive, may be applied to operation of the modifications of the device shown in Figs. 3 and 4 which may also have similar swiveling mountings so that they can be tilted to convenient operating positions.

It is apparent that the invention provides a device which is simple, practical and inexpensive in construction and capable of greatly facilitating and expediting the setting up of such cartons where large numbers of them are required in the current practice of food distributing concerns of packaging eggs in such retail cartons.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A device for setting up collapsible cellular cartons of the type having front and rear walls, a central longitudinal partition and two groups of transverse partitions hingedly connected to the tops of said front and rear walls and adapted to be swung in opposite directions, respectively, from horizontal to erected vertical position, said device comprising a base having thereon a group of two or more consecutive, upwardly projecting, spaced blades adapted to engage the partitions of one of said groups, a part movable on said base and having thereon a group of two or more consecutive, upwardly projecting, spaced blades adapted to engage the partitions of the other of said groups, said blades being adapted to have an inverted, partially erected carton pressed thereagainst and to engage and partially erect said transverse partitions, and means for moving said part on said base to effect relative movement of said groups of partitions in opposite directions and complete the erection of said partitions.

2. A device for setting up collapsible cellular cartons of the type having front and rear walls, a central longitudinal partition and two groups of transverse partitions hingedly connected to the tops of said front and rear walls and adapted to be swung in opposite directions, respectively, from horizontal to erected vertical position, said device comprising an elongated base having thereon a group of two or more consecutive, upwardly projecting, blades spaced longitudinally thereon and adapted to engage the partitions of one of said groups, a part slidable longitudinally on said base and having thereon a group of two or more consecutive, upwardly projecting, blades spaced longitudinally thereon and adapted to engage the partitions of the other of said groups, said blades being adapted to have an inverted, partially erected carton pressed downwardly thereon and to engage and partially erect said partitions, and means for sliding said part on said base to effect relative movement of said group of partitions in opposite directions and complete the erection of said partitions.

3. A device for setting up collapsible cellular cartons of the type having front and rear walls, a central longitudinal partition and two groups of transverse partitions hingedly connected to the tops of said front and rear walls and adapted to be swung in opposite directions, respectively, from horizontal to erected vertical position, said device comprising an elongated base having thereon a group of two or more consecutive, upwardly projecting, wire loops spaced longitudinally thereon and adapted to engage the partitions of one of said groups, longitudinal slideways on said base, a part having means engaged in said slideways and slidable longitudinally on said base, a group of two or more consecutive, upwardly projecting, wire loops spaced longitudinally on said part and adapted to engage the partitions of the other of said groups, said loops having their tops recessed for said longitudinal partition and being adapted to have an inverted, partially erected carton pressed downwardly and to engage and partially erect said transverse partitions, and means for sliding said part on said base to effect relative movement of said groups of partitions in opposite directions and complete the erection of said partitions.

4. A device for setting up collapsible cellular cartons of the type having front and rear walls, a central longitudinal partition and two groups of transverse partitions hingedly connected to the tops of said front and rear walls and adapted to be swung in opposite directions, respectively, from horizontal to erected vertical position, said device comprising an elongated base having thereon a group of two or more consecutive, upwardly projecting, blades spaced longitudinally thereon and adapted to engage the partitions of one of said groups, a part slidable longitudinally on said base and having thereon a group of two or more consecutive, upwardly projecting, blades spaced longitudinally thereon and adapted to engage the partitions of the other of said groups, said blades being adapted to have an inverted, partially erected carton pressed downwardly thereon and to engage and partially erect said transverse partitions and a manually engageable abutment on said part for sliding it on said base to effect relative movement of said groups of partitions in opposite directions and complete the erection of said partitions.

5. A device for setting up collapsible cellular cartons of the type having front and rear walls, a central longitudinal partition and two groups of transverse partitions hingedly connected to the tops of said front and rear walls and adapted to be swung in opposite directions, respectively, from horizontal to erected vertical position, said device comprising an elongated base having thereon a group of two or more consecutive, upwardly projecting, wire loops spaced longitudinally thereon and adapted to engage the partitions of one of said groups, longitudinal slideways on said base, a part having means engaged in said slideways and slidable longitudinally on said base, a group of two or more consecutive, upwardly projecting, wire loops spaced longitudinally on said part and adapted to engage the partitions of the other of said groups, said loops being adapted to receive an inverted, partially erected carton and to engage and partially erect said transverse partition, and a manually engageable abutment on the end of said part and projecting above said loops for sliding said part on said base to effect relative movement of said groups of partitions in opposite directions and complete the erection of said partitions.

6. A device for setting up collapsible cellular cartons of the type having front and rear walls, a central longitudinal partition and two groups of transverse partitions hingedly connected to the tops of said front and rear walls and adapted to be swung in opposite directions, respectively, from horizontal to erected vertical position, said device comprising a base having thereon a group of upwardly projecting spaced blades adapted to engage the partitions of one of said groups, a part movable on said base and having thereon a group of upwardly projecting spaced blades adapted to engage the partitions of the other of said groups, said blades having recessed tops and being adapted to have an inverted, partially erected carton pressed thereagainst and to engage and partially erect said transverse partitions, electric motor means for moving said part on said base to effect relative movement of said groups of partitions in opposite directions, and switch means positioned on said base for operation by a portion of a carton pressed against said loops, to energize said motor means and complete the erection of said partitions.

7. A device for setting up collapsible cellular cartons of the type having front and rear walls, a central longitudinal partition and two groups of transverse partitions hingedly connected to the tops of said front and rear walls and adapted to be swung in opposite directions, respectively, from horizontal to erected vertical position, said device comprising a base having thereon a group of upwardly projecting spaced blades adapted to engage the partitions of one of said groups, a part movable on said base and having thereon a group of upwardly projecting spaced blades adapted to engage the partitions of the other of said groups, said blades being adapted to receive an inverted, partially erected carton and to engage and partially erect said transverse partitions, solenoid means on said base for moving said part to effect relative movement of said groups of partitions in opposite directions, and switch means including a movable plate positioned on said base for engagement by a portion of a carton pressed against said blades, for operating said solenoid means to effect erection of said partitions.

8. A device for setting up collapsible cellular cartons of the type having front and rear walls, a central longitudinal partition and two groups of transverse partitions hingedly connected to the tops of said front and rear walls and adapted to be swung in opposite directions, respectively, from horizontal to erected vertical position, said device comprising an elongated base and having thereon a group of upwardly projecting wire loops spaced longitudinally thereon and adapted to engage the partitions of one of said groups, longitudinal slideways on said base, a part having means engaged in said slideways and slidable longitudinally on said base, a group of upwardly projecting wire loops spaced longitudinally on said part and adapted to engage the partitions of the other of said groups, said loops having their tops recessed for said longitudinal partition and being adapted to receive an inverted, partially erected carton and to engage and partially erect said transverse partitions, spring means for sliding said part in one direction, solenoid means for sliding said part in the opposite direction, and switch means on said base including a movable plate positioned for engagement by a portion of said longitudinal partition of a carton pressed against said loops, for operating said solenoid means to complete the erection of said partitions.

9. A device for setting up collapsible cellular cartons of the type having front and rear walls, a central longitudinal partition and two groups of transverse partitions hingedly connected to the tops of said front and rear walls and adapted to be swung in opposite directions, respectively, from horizontal to erected vertical position, said device comprising a base having thereon a group of two or more consecutive, upwardly projecting, spaced blades adapted to engage the partitions of one of said groups, a part movable on said base and having thereon a group of two or more consecutive, upwardly projecting, spaced blades adapted to engage the partitions of the other of said groups, said blades being adapted to have an inverted, partially erected carton pressed thereagainst and to engage and partially erect said transverse partitions, means for moving said part on said base to effect relative movement of said groups of partitions in opposite directions to complete the direction thereof, supporting means, and means adjustably mounting said base on said supporting means for adjusting said device to convenieint operating positions.

10. A device for setting up collapsible cellular cartons of the type having front and rear walls, a central longitudinal partition and two groups of transverse partitions hingedly connected to the tops of said front and rear walls and adapted to be swung in opposite directions, respectively, from horizontal to erected vertical position, said device comprising a base having thereon a group of two or more consecutive, upwardly projecting, spaced blades adapted to engage the partitions of one of said groups, a part movable on said base and having thereon a group of two or more consecutive, upwardly projecting, spaced blades adapted to engage the partitions of the other of said groups, said blades being adapted to have an inverted, partially erected carton pressed thereagainst and to engage and partially erect said transverse partitions, means for moving said part on said base to effect relative movement of said groups of partitions in opposite directions to complete the erection of said partitions, supporting means, means pivotally connecting said base to said supporting means for adjustment of said device to different operating positions, and means for clamping said device in adjusted position on said supporting means.

EDWIN H. MOBLEY.

REFERENCES CITED

The following references are of record in the file of this patent:

FOREIGN PATENTS

| Number | Country | Date |
|---|---|---|
| 81,271 | Sweden | Aug. 21, 1934 |